United States Patent
Chang et al.

(10) Patent No.: US 8,976,719 B2
(45) Date of Patent: *Mar. 10, 2015

(54) SYSTEMS AND METHODS FOR PROVIDING CATEGORIZED CHANNEL RESERVATION

(71) Applicant: MediaTek Inc, Hsin-Chu (TW)

(72) Inventors: Chia-Ming Chang, Hsinchu (TW); Ching-Hwa Yu, Tainan (TW); Shih-Chang Su, Hukou Township, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,745

(22) Filed: Jun. 25, 2013

(65) Prior Publication Data

US 2013/0286976 A1    Oct. 31, 2013

Related U.S. Application Data

(63) Continuation of application No. 13/025,362, filed on Feb. 11, 2011, now Pat. No. 8,493,897.

(51) Int. Cl.
*H04B 7/00* (2006.01)
*H04W 72/04* (2009.01)
(Continued)

(52) U.S. Cl.
CPC ...... *H04W 72/0406* (2013.01); *H04W 74/0825* (2013.01); *H04W 48/02* (2013.01); *H04W 48/10* (2013.01); *H04W 88/10* (2013.01)
USPC ........................................................ 370/310

(58) Field of Classification Search
CPC ... H04W 76/04; H04W 76/06; H04W 76/062; H04W 76/064

USPC .......... 370/310, 328, 339, 431, 462; 455/403, 455/422, 73, 78–83

See application file for complete search history.

(56) References Cited

U.S. PATENT DOCUMENTS

| | | | |
|---|---|---|---|
| 7,039,358 B1 | 5/2006 | Shellhammer et al. | |
| 7,299,072 B2 * | 11/2007 | Ninomiya | 455/562.1 |

(Continued)

FOREIGN PATENT DOCUMENTS

| | | |
|---|---|---|
| CN | 1801809 | 7/2006 |
| CN | 101384089 | 3/2009 |
| CN | 101547028 | 9/2009 |

OTHER PUBLICATIONS

International Search Report dated Nov. 17, 2011.

(Continued)

*Primary Examiner* — Dmitry H Levitan
(74) *Attorney, Agent, or Firm* — McClure, Qualey & Rodack, LLP

(57) ABSTRACT

A wireless communications system and method configured to operate and communicate with a plurality of wireless communications stations in compliance with a wireless communications protocol, wherein said communications comprise transmitting a first control packet to disable at least one of the wireless communications stations from data transmissions in compliance with the wireless communications protocol, and transmit a second control packet to enable at least one of the disabled wireless communications stations to perform the data transmissions. The first control packet is transmitted using a first configuration, and the second control packet is transmitted using a second configuration.

2 Claims, 10 Drawing Sheets

(51) Int. Cl.
  *H04W 74/08* (2009.01)
  *H04W 48/02* (2009.01)
  *H04W 48/10* (2009.01)
  *H04W 88/10* (2009.01)

(56) References Cited

U.S. PATENT DOCUMENTS

| | | |
|---|---|---|
| 7,609,674 B2 * | 10/2009 | Kwon et al. .................. 370/329 |
| 7,643,463 B1 | 1/2010 | Linsky et al. |
| 7,715,434 B2 | 5/2010 | Fischer et al. |
| 7,801,099 B2 | 9/2010 | Desai |
| 7,809,399 B2 | 10/2010 | Lu et al. |
| 7,826,411 B2 | 11/2010 | Gonikberg et al. |
| 8,203,991 B2 | 6/2012 | Thoukydides |
| 8,364,080 B2 * | 1/2013 | Desai et al. .................. 455/41.2 |
| 8,526,349 B2 * | 9/2013 | Fischer ........................ 370/312 |
| 2008/0233875 A1 | 9/2008 | Desai et al. |
| 2013/0121329 A1 | 5/2013 | Desai et al. |

OTHER PUBLICATIONS

English language machine translation of CN 1801809 (published Jul. 12, 2006).

* cited by examiner

SYSTEMS AND METHODS FOR PROVIDING CATEGORIZED CHANNEL RESERVATION

CROSS REFERENCE TO RELATED APPLICATIONS

This application is a continuation application of U.S. application Ser. No. 13/025,362, filed Feb. 11, 2011, now U.S. Pat. No. 8,493,897, the contents of which are incorporated herein by reference.

BACKGROUND OF THE INVENTION

1. Field of the Invention

The invention relates generally to the coexistence between a plurality of wireless communications modules, and more particularly, to systems and methods for reducing interference between a plurality of co-existed wireless communications modules.

2. Description of the Related Art

To an increasing extent, a multitude of wireless communications technologies are being merged into wireless communications devices. As shown in FIG. 1, a wireless communications device 10 may establish a wireless local area network (WLAN) via a Wireless Fidelity (WiFi) module thereof and simultaneously communicate with a Bluetooth (BT) handset through a BT module thereof. Generally, a WLAN system is implemented inside buildings as an extension to wired local area networks (LANs) and is able to provide the last few meters of connectivity between a wired network and mobile or fixed devices. According to the IEEE 802.11 standard, most WLAN systems may operate in the 2.4 GHz license-free frequency band and have very low throughput rates due to the interference from the co-located BT systems. Referring to FIG. 1, the wireless communications device 10 serves as an access point (AP) for providing WiFi communication services via the WiFi module to the WiFi stations in the established WLAN. An AP typically receives, buffers, and transmits data between the WLAN and the wired network infrastructure. The AP may support, on average, twenty WiFi stations and have a coverage varying from 20 meters in an area with obstacles (walls, stairways, elevators etc) to 100 meters in an area with clear line of sight. For example, the wireless communications device 10 may receive web-browsing data from the Internet and further transmit the data through the established WLAN to the WiFi notebook (NB) 20, and vice versa. On the other hand, BT is an open wireless protocol for exchanging data over short distances from fixed and mobile devices, creating personal area networks (PANs). The wireless communications device 10 may receive voice over the Internet protocol (VoIP) data from the Internet and then forward the VoIP data through the established PAN to the BT handset 30. Alternatively, the wireless communications device 10 may receive digital music via the WiFi module and transmit the digital music through the established PAN to be played back in the BT handset 30. Note that the WLAN and BT systems both occupy a section of the 2.4 GHz Industrial, Scientific, and Medical (ISM) band, which is 83 MHz-wide. Due to cost issues as well as space requirements for components, modern electronic devices, such as cellular phones, Ultra-Mobile PCs (UMPCs) or others, are equipped with WiFi and BT modules sharing a single antenna instead of multiple antennas.

As an example shown in FIG. 2, a BT system uses a Frequency Hopping Spread Spectrum (FHSS) and hops between 79 different 1 MHz-wide channels in a Bluetooth spectrum. A WLAN system uses a Direct Sequence Spread Spectrum (DSSS) instead of a FHSS. A WLAN system carrier remains centered on one channel, which is 22 MHz-wide. When the WiFi module and the BT module are operating simultaneously in the same area, as shown in FIG. 1, the single WLAN channel, which is 22 MHz-wide, occupies the same frequency space as 22 out of 79 BT channels which are 1 MHz-wide. When a BT transmission occurs on a frequency band that falls within the frequency space occupied by an ongoing WLAN transmission, a certain level of interference may occur, depending on the signal strength thereof. Due to the fact that the WiFi module and BT module share the same spectrum and also share a single antenna, avoiding interference therebetween is required.

FIG. 3 is a diagram illustrating operations of the WiFi module and BT module sharing a single antenna in the wireless communication device of FIG. 1. In FIG. 3, the shared single antenna is switched between WLAN and BT communication services in a given time slot for transceiving data. If the BT communication service carries audio data that requires real-time transmission, for example, the Synchronous Connection-Oriented (SCO) packets and the Asynchronous Connection-Less (ACL) packets, the BT communication service would have a higher priority over the WLAN communication service. In this case, when a WLAN transceiving process takes place at the same time as the real-time BT transceiving process, the time slot will be assigned to the BT transceiving process and the WLAN transceiving process will be blocked. As shown in FIG. 3, the WiFi receiving operation (Rx operation) 1 occurs in the time slot, while the BT communication service is idle. Therefore, the Rx operation 1 is performed without interference and an acknowledgement (ACK) message 2 is transmitted to the WiFi NB as a reply message indicating that the Rx operation 1 is finished. Following the Rx operation 1, another WiFi Rx operation 3 is performed. The Rx operation 3 is also performed without interference because the BT communication service is in the idle state. However, an ACK message 4 in response to the Rx operation 3 can not be transmitted, as the channel resources are already assigned to the BT transmitting operation (Tx operation). Accordingly, the Rx operation 3 would be determined to have failed. In response to the failure, the WiFi NB 20 would retransmit the data with a lower data rate in an attempt to successfully transmit data to the WiFi module in the wireless communications device 10. Unfavorably, the re-performed Rx operation 3 (denoted as 5), with a prolonged operation period, will be more likely to overlap with the BT transceiving process. Another data retransmitted with a lower data rate than that of the prior retransmission would be further attempted, causing more overlap with the BT transceiving process than the prior attempt. It is noted that, the channel resources of all the WiFi stations are reserved for the BT transceiving process to avoid the coexistence interference, even though the received signals from the WiFi stations located in a short distance may have enough Signal to Interference and Noise Ratio (SINR) to withstand the coexistence interference. As a result, WiFi throughput is highly hindered as the WiFi and BT modules share a single antenna.

BRIEF SUMMARY OF THE INVENTION

In light of the previously described problems, there exists a need for a system and method, in which categorized channel reservation may be accomplished while avoiding interference between a plurality of wireless communications modules co-located in a wireless communications system and sharing a single antenna.

One aspect of the invention discloses a wireless communications system for categorized channel reservation, comprising a first wireless communications module and a second wireless communications module. The first wireless communications module is configured to transmit or receive a plurality of first wireless signals. The second wireless communications module is configured to transmit a first control packet according to an activity schedule of the first wireless communications module to disable a plurality of wireless communications stations from data transmissions, and transmit a second control packet to enable a predetermined number of the wireless communications stations to perform the data transmissions.

Another aspect of the invention discloses a method for providing categorized channel reservation in a wireless communications system comprising a plurality of wireless communications modules. The method comprises the steps of: determining an activity schedule of a first wireless communications module for transmitting or receiving a first wireless signals; transmitting, by a second wireless communications module, a first control packet according to the activity schedule of the first wireless communications module to disable a plurality of wireless communications stations from data transmissions; and transmitting, by the second wireless communications module, a second control packet to enable a predetermined number of the wireless communications stations to perform the data transmissions.

Other aspects and features of the invention will become apparent to those with ordinary skill in the art upon review of the following descriptions of specific embodiments of the wireless communications systems and methods for categorized channel reservation.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
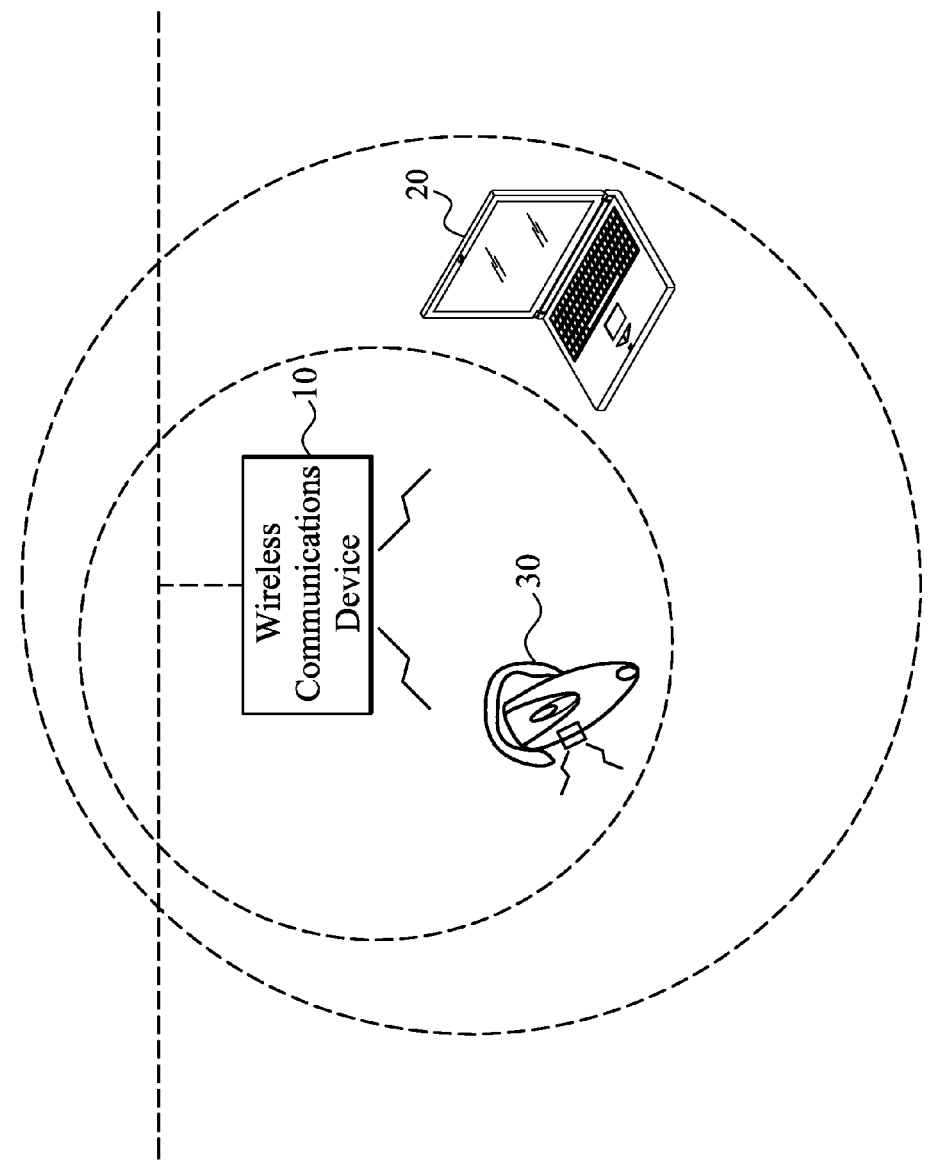
FIG. 1 shows a wireless communications device establishing a WLAN via a WiFi module thereof as well as communicating with a BT handset through a BT module thereof.
Figure 2:
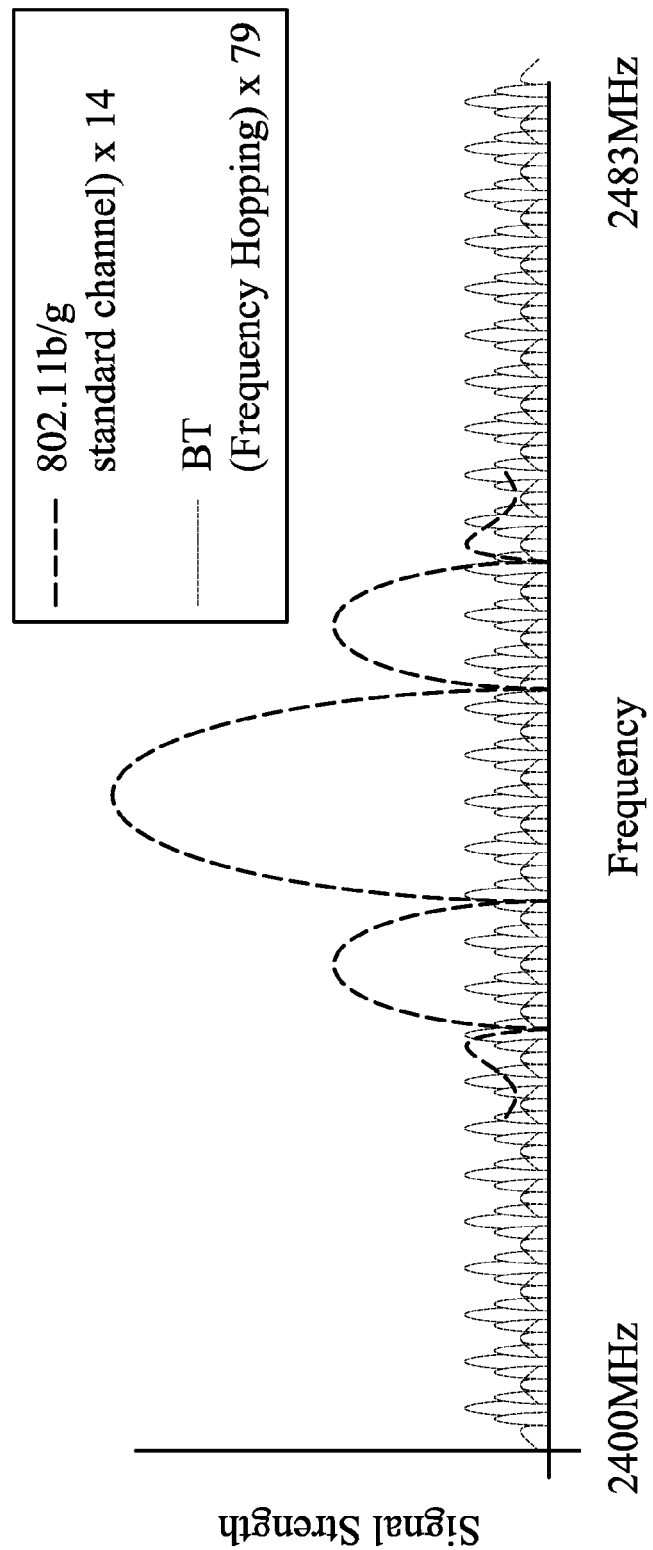
FIG. 2 shows a diagram illustrating channel specifications of WiFi and BT systems.
Figure 3:
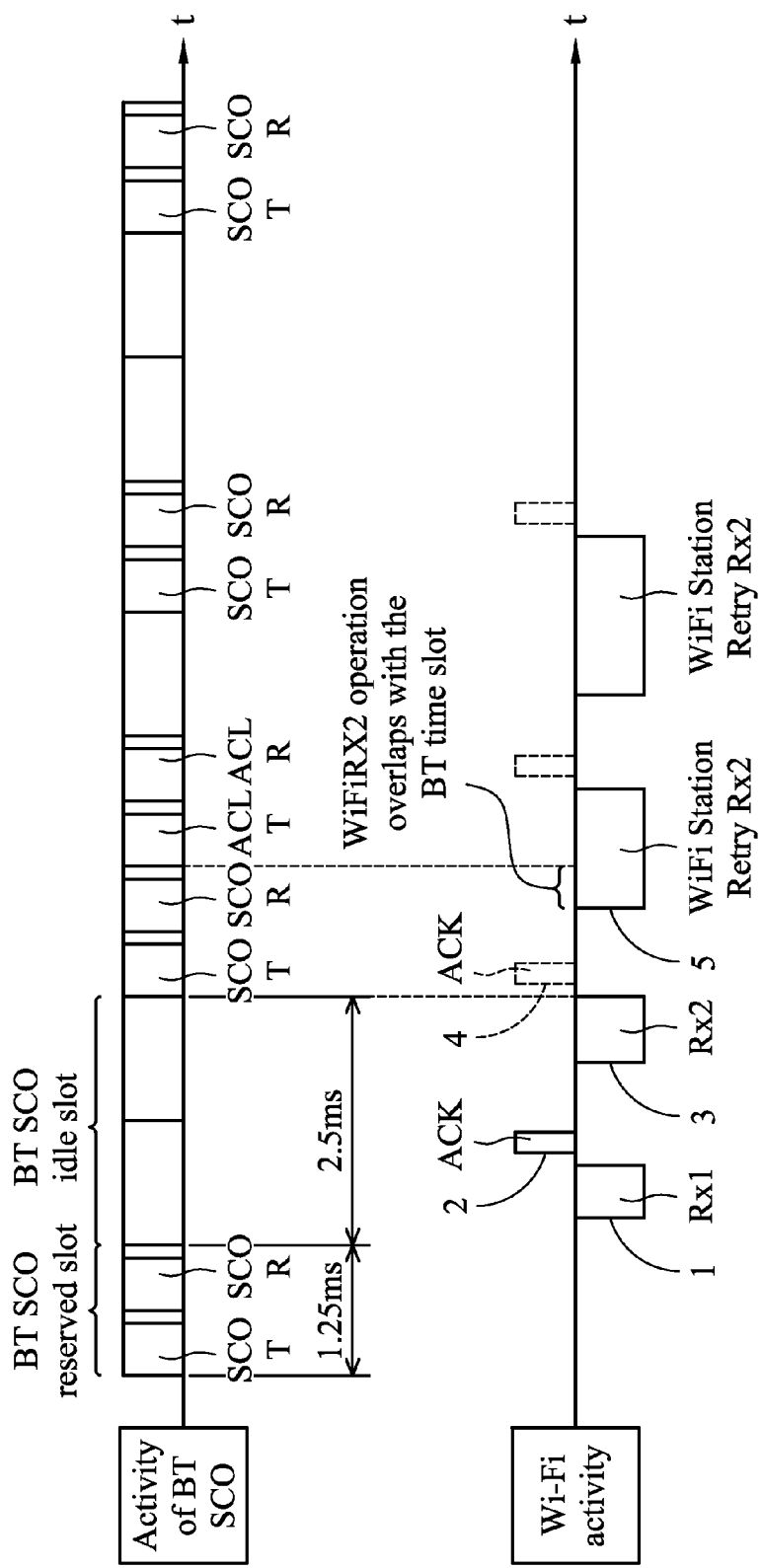
FIG. 3 shows a diagram illustrating operations of the WiFi module and BT module sharing a single antenna in the wireless communication device of FIG. 1.
Figure 4A:
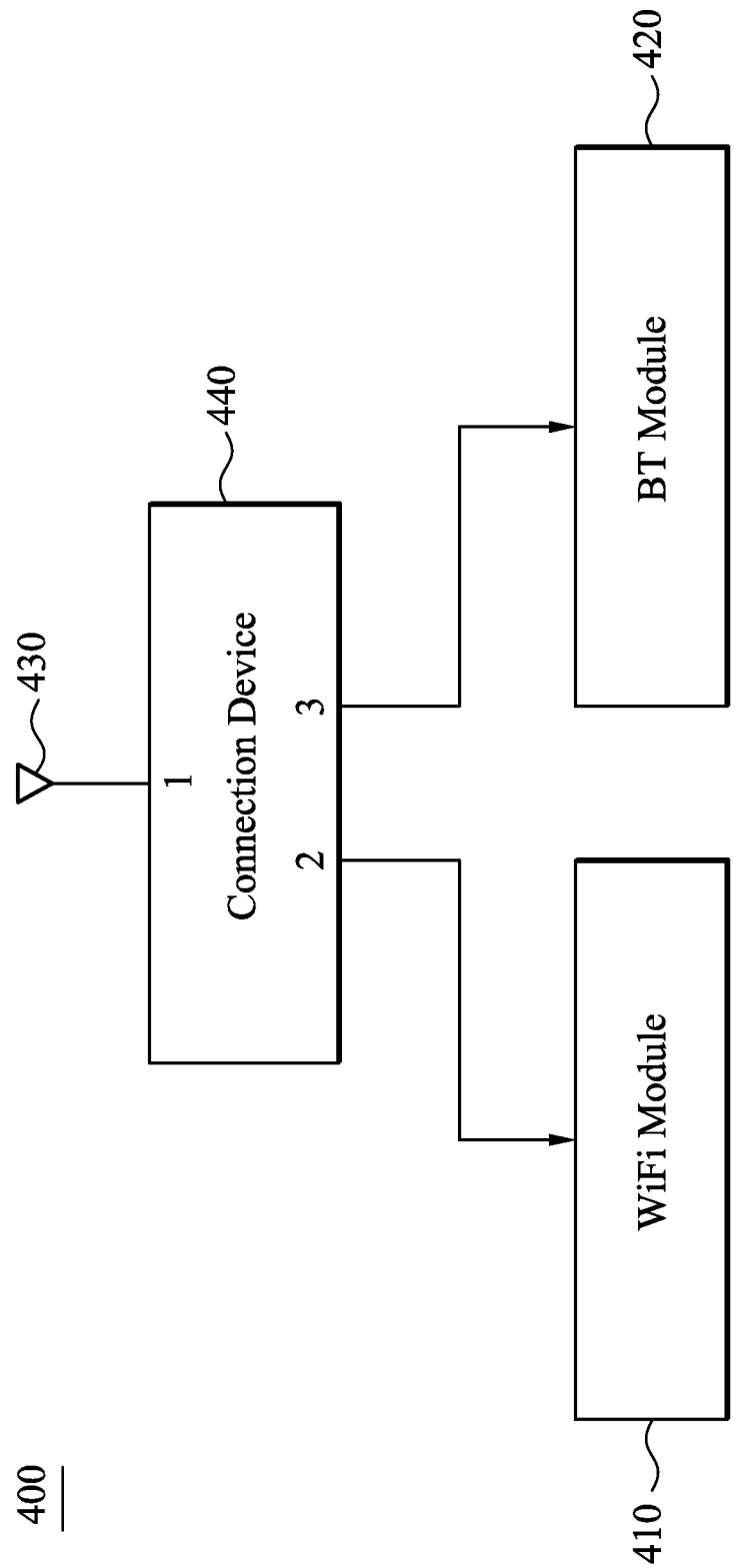
FIG. 4A is a block diagram illustrating a wireless communications system with multiple co-located wireless communications modules sharing a single antenna according to an embodiment of the invention.
Figure 4B:
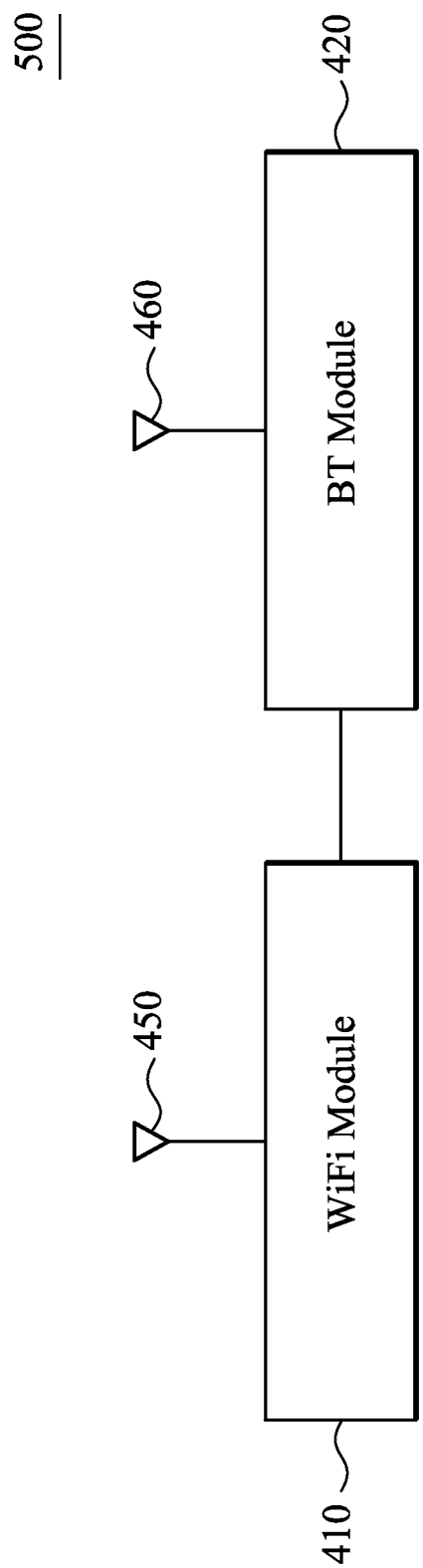
FIG. 4B is a block diagram illustrating a wireless communications system with multiple co-located wireless communications modules each having a respective antenna according to an embodiment of the invention.

In order to improve WiFi throughput in a wireless communication system with multiple co-located wireless communications modules, the invention provides categorized channel reservation for managing WiFi channel resources during operations of the co-located wireless communications modules. FIG. 4A is a block diagram illustrating a wireless communications system with multiple co-located wireless communications modules sharing a single antenna according to an embodiment of the invention. The wireless communications system 400 comprises a WiFi module 410, a BT module 420, an antenna 430, and a connection device 440. It is to be understood that the antenna 430 may be disposed outside of the wireless communications system 400 or the WiFi module 410 and the BT module 420 may be combined in a wireless communications chipset, and the invention can not be limited thereto. The WiFi module 410 provides the functionality of WiFi communications via the antenna 430, and serves as an AP for providing WiFi communication services to WiFi stations in the established WLAN. The BT module 420 provides the functionality of BT communications via the antenna 430. Both of the WiFi module 410 and the BT module 420 may contain a processing unit, such as a general-purposed processor or a micro-control unit (MCU), to load and execute a series of program codes of the respective wireless communication protocol from a storage unit to provide the functionality of wireless communications. The antenna 430 may be configured to operate in different radio frequencies according to the controlling wireless communications module. For example, if the controlling wireless communications module is the WiFi module 410, the antenna 430 may be configured to operate in a 22 MHz-wide channel selected from the 2.4 GHz license-free frequency band. If the controlling wireless communications module is the BT module 420, the antenna 430 may be configured to operate in 79 different 1 MHz-wide hopping channels selected from the 2.4 GHz license-free frequency band. The connection device 440, which consists of three terminals 1, 2, and 3, is configured to connect the terminal 1 to either one of the terminals 2 and 3, to allow the WiFi module 410 or the BT module 420 to get access to the antenna 430. The connection device 440 may be implemented with a direction coupler, or any other device which may enable simultaneous transmissions/receptions of the WiFi module 410 and the BT module 420. Alternatively, the connection device 440 may be omitted, and the WiFi module 410 and the BT module 420 may each be configured to connect to a respective antenna for dedicated transmission and reception, as shown in FIG. 4B.

When detecting operations of the BT module 420, the WiFi module 410 may transmit a first control packet, whose destination does not indicate a group address, to all WiFi stations in the WLAN according to the activity schedule of the BT module 420. In one embodiment, the first control packet may be a CLEAR TO SEND (CTS) TO SELF (CTS2SELF) packet. Specifically, the first control packet may specify a duration in which the data transmissions from all WiFi stations in the WLAN are not allowed, and the duration may be determined based on the potential operations of the BT module 420 indicated in the activity schedule of the BT module 420. In one embodiment, the activity schedule of the BT module 420 may be generated by the BT module 420 and then forwarded to the WiFi module 410; while in another embodiment, the wireless communications system 400 may further comprise a coexistence manager (not shown) for coordinating the potential operations of the WiFi module 410 and the BT module 420, and the activity schedule of the BT module 420 may be requested from the coexistence manager. In response to receiving the first control packet, the WiFi stations are informed of a silence period and the data transmissions are disabled. Subsequently, the WiFi module 410 may transmit a second control packet to all WiFi stations in the WLAN to inform the recovery from the silence period. In one embodiment, the second control packet may be a Contention Free End (CF-END) packet. Note that the second control packet is transmitted in a special condition such that only a predetermined number of the WiFi stations may be able to respond to the second control packet. Accordingly, only the predetermined number of the WiFi stations may be enabled to perform the data transmissions. Though the wireless communications system 400 is given as an example for the categorized channel reservation of the invention, it is noted that the BT module 420 may be replaced with a difference wireless communications module using another wireless communications technology, such as a Worldwide Interoperability for Microwave Access (WiMAX) module, a Long Term Evolution (LTE) module, a Wideband Code Division Multiple Access (WCDMA) module, or others, and the first control packet and the second control packet may be transmitted according to the activity schedule of the replacing wireless communications module.

Figure 5:
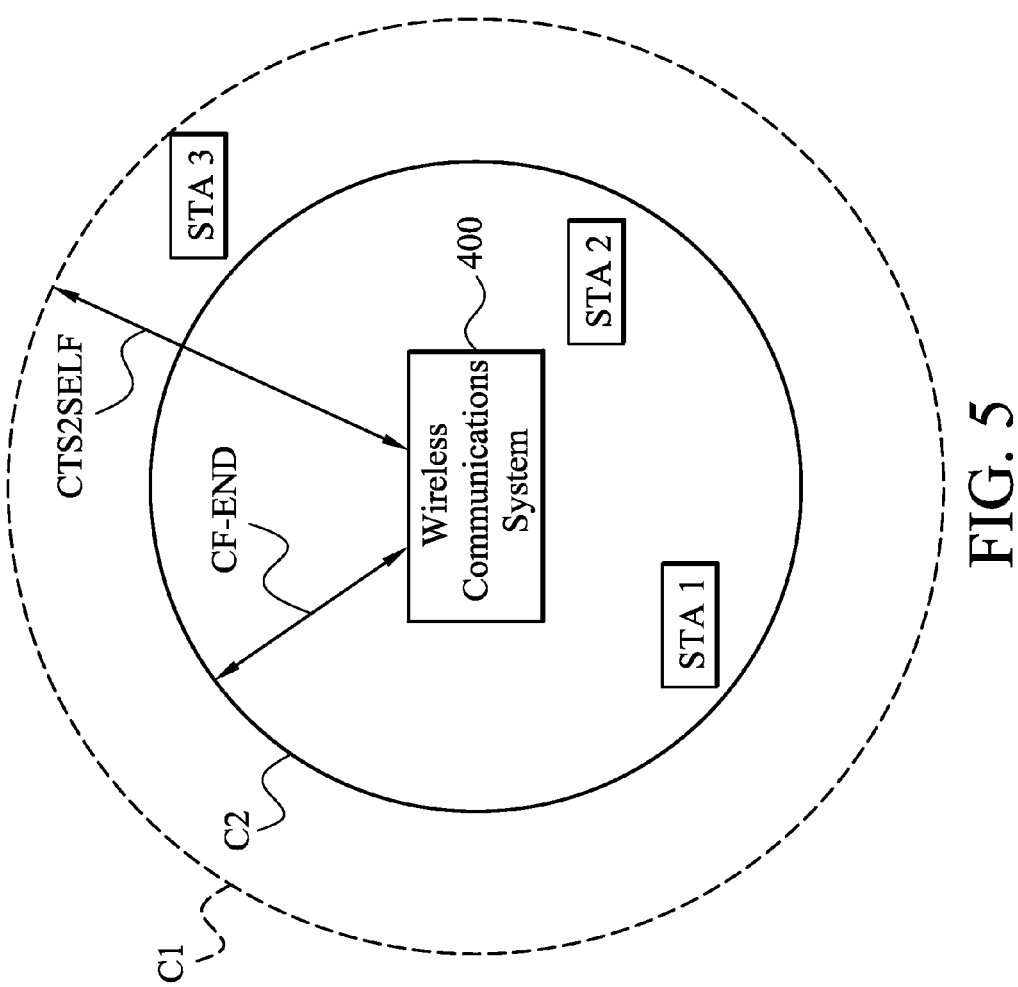
FIG. 5 is a schematic diagram illustrating the categorized channel reservation with different transmission powers according to an embodiment of the invention.

FIG. 5 is a schematic diagram illustrating the categorized channel reservation with different transmission powers according to an embodiment of the invention. In this embodiment, the CTS2SELF packet is employed as the first control packet for disabling the WiFi stations from data transmissions, and the CF-END packet is employed as the second control packet for enabling the data transmissions in a predetermined number of the WiFi stations; while in other embodiments, the first control packet and the second control packet may each be any WiFi control packet whose destination does not indicate a group address, and particularly, the WiFi control packet for replacing the CTS2SELF packet requests the receiving WiFi stations to disable data transmissions, and the WiFi control packet for replacing the CF-END packet requests the receiving WiFi stations to enable data transmissions. Specifically, the CTS2SELF packet is transmitted using a first transmission power, such that all WiFi stations in the coverage of the WLAN, denoted as the circle C1, may successfully receive the CTS2SELF packet. On the other hand, the CF-END packet is transmitted using a second transmission power which is lower than the first transmission power, such that only the WiFi stations located within a specific distance from the wireless communications system 400, denoted as the circle C2, may receive the CF-END packet successfully while the WiFi stations located outside of the circle C2 may not receive the CF-END packet due to the low transmission power used. As shown in FIG. 5, there are 3 WiFi stations, STAs 1~3, in the WLAN established by the wireless communications system 400, where only STA 1 and STA 2 are located in the circle C2 and are able to receive the CF-END packet successfully while STA 3 is not able to receive the CF-END packet since it is located outside of the circle C2.

Figure 6:
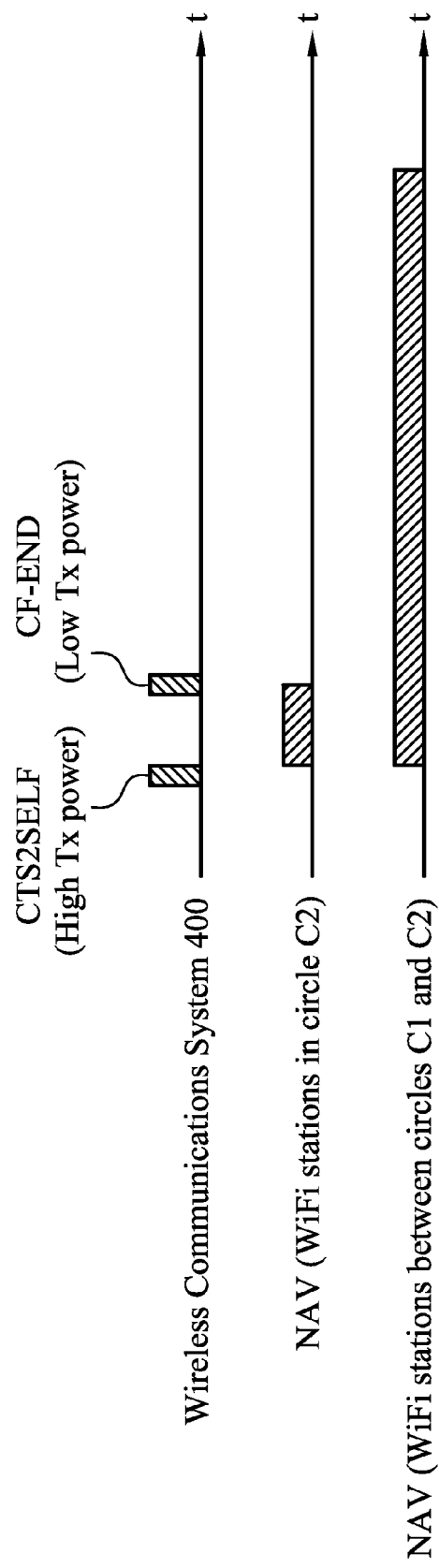
FIG. 6 is a schematic diagram illustrating the network allocation vectors (NAVs) of the WiFi stations located in and outside of the circles C2 according to an embodiment of the invention.

FIG. 6 is a schematic diagram illustrating the network allocation vectors (NAVs) of the WiFi stations located in and outside of the circles C2 according to an embodiment of the invention. An NAV is a counter maintained by one WiFi station with the value set to the amount of time the access medium stays occupied by another WiFi station. The access medium is only available when the counter counts down to zero, and only then, the WiFi station may perform data transmission and/or reception. If the WiFi module 410 detects that a potential BT transceiving process is going to take place, it may transmit a CTS2SELF packet to all WiFi stations in its serving area. To ensure the delivery of the CTS2SELF packet, the WiFi module 410 may use a high transmission power to transmit the CTS2SELF packet. The WiFi module 410 may further set the duration according to the activity schedule of the BT module 420. For example, the WiFi module 410 may set the duration to a potential period of time the BT transceiving process would last. When the WiFi stations located in the circle C1, i.e. STA1~STA3, receives the CTS2SELF packet from the wireless communications system 400, they may set their NAVs from zero to the duration indicated in the CTS2SELF packet, and the data transmissions are disabled until the NAVs count down to zero. Later, the wireless communications system 400 may transmit a CF-END packet to all WiFi stations in its serving area, wherein the CF-END packet is transmitted using a low transmission power. Specially, the low transmission power may only guarantee that the CF-END packet is received by the WiFi stations located in the circle C2, i.e. STA 1 and STA 2. In response to receiving the CF-END packet, STA 1 and STA 2 may enable the data transmissions by resetting their NAVs to zero. Meanwhile, the data transmissions by the WiFi stations located in the area between the circles C1 and C2, i.e. STA 3, would remain disabled since the STA 3 does not receive the CF-END packet and the countdown of the NAV remains. This way, the wireless communications system 400 does not have to sacrifice the performances of the WiFi stations located in a short distance from the wireless communications system 400, even when there are WiFi stations located in a long distance from the wireless communications system 400. Thus, the performances of the short-distance WiFi stations may be kept.

Figure 7:
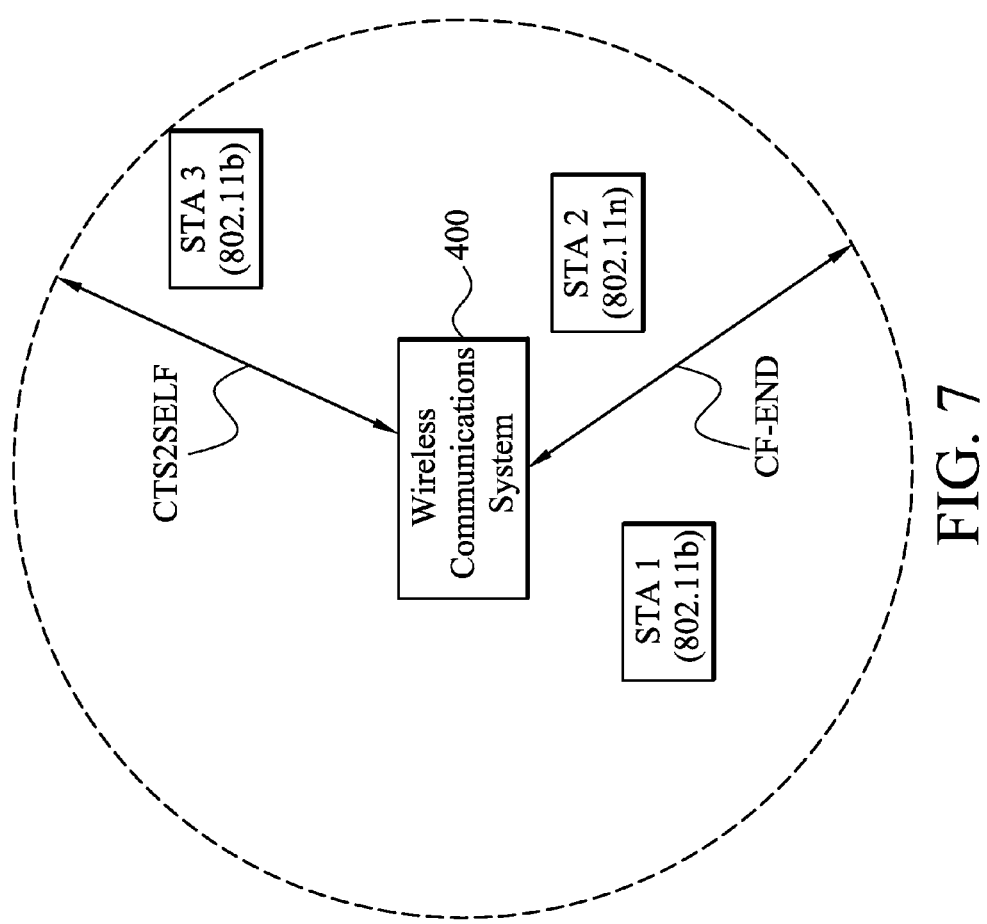
FIG. 7 is a schematic diagram illustrating the categorized channel reservation with different modulation schemes according to an embodiment of the invention.
Figure 8:
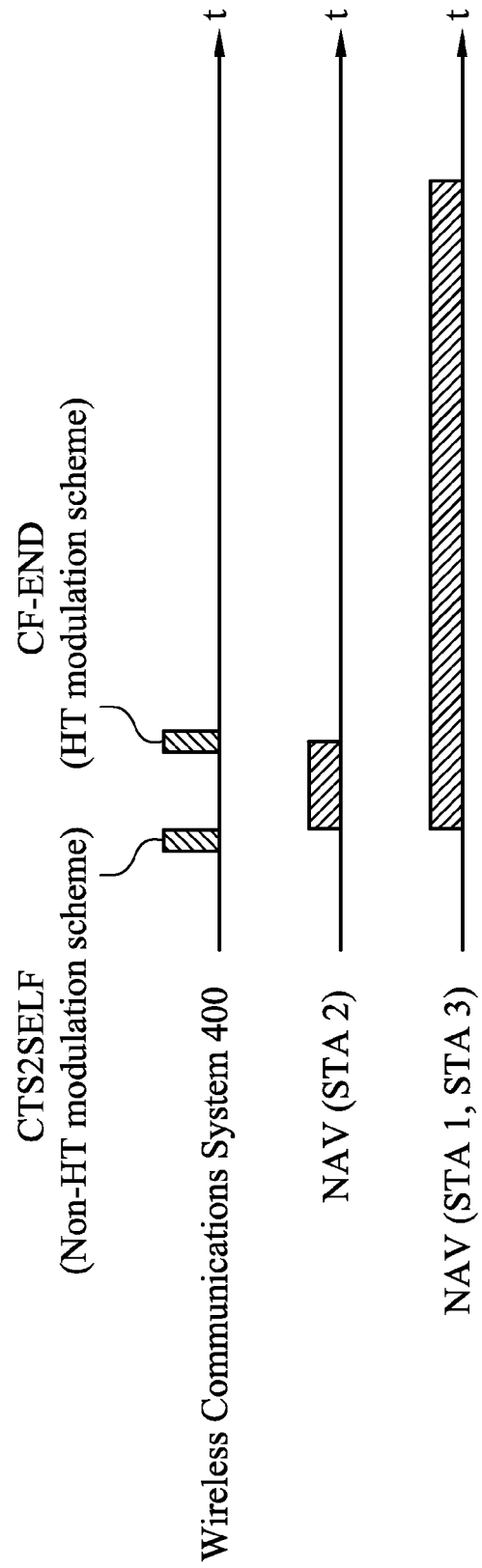
FIG. 8 is a schematic diagram illustrating the network allocation vectors (NAVs) of the WiFi stations supporting the non-HT and HT modulation schemes according to an embodiment of the invention.

FIG. 7 is a schematic diagram illustrating the categorized channel reservation with different modulation schemes according to an embodiment of the invention. Similar to FIG. 5, there are 3 WiFi stations, STA 1~3, located in the serving area of the WLAN established by the WiFi module 410 of the wireless communications system 400. In this embodiment, it is assumed that STA 1 and STA 3 are in compliance with the standard 802.11b, while STA 2 is in compliance with the standard 802.11n. Since the standards are backward compatible and the latter standard may specify new communication technologies that are not supported by the former standards, the WiFi module 410 may use different modulation schemes to transmit the CTS2SELF packet and the CF-END packet, respectively. Specifically, the WiFi module 410 may use a first modulation scheme, which is supported by both standards 802.11b and 802.11n, to transmit the CTS2SELF packet, and use a second modulation scheme, which is supported by only the standard 802.11n, to transmit the CF-END packet. For example, the WiFi module 410 may use the non-HighThroughput (HT) modulation scheme to transmit the CTS2SELF packet, and use the HT modulation scheme to transmit the CF-END packet. FIG. 8 is a schematic diagram illustrating the network allocation vectors (NAVs) of the WiFi stations supporting the non-HT and HT modulation schemes according to an embodiment of the invention. Since the non-HT modulation scheme is supported by both standards 802.11b and 802.11n, STA 1 to 3 may all receive the CTS2SELF packet transmitted using the non-HT modulation scheme. In response to receiving the CTS2SELF packet, STA 1 to 3 may set their NAVs from zero to the duration indicated in the CTS2SELF packet, and the data transmissions are disabled until the NAVs count down to zero. Later, STA 2 may receive the CF-END packet transmitted using the HT modulation scheme since it supports the standard 802.11n, while STA 1 and STA 3 supporting the standard 802.11b may not receive the CF-END packet. When receiving the CF-END packet, STA 2 may enable the data transmission by resetting its NAVs to zero. Meanwhile, the data transmissions by STA 1 and STA 3 would remain disabled and the countdowns of the NAVs for STA 1 and STA 3 would continue. This way, the wireless communications system 400 does not have to sacrifice the performances of the WiFi stations supporting the HT modulation scheme, even when there are WiFi stations supporting the non-HT modulation scheme in the established WLAN. Thus, the performances of the HT WiFi stations may be kept. Note that the CTS2SELF packet and the CF-END packet may each be replaced with any WiFi control packet whose destination does not indicate a group address, and particularly, the WiFi control packet for replacing the CTS2SELF packet requests the receiving WiFi stations to disable data transmissions, and the WiFi control packet for replacing the CF-END packet requests the receiving WiFi stations to enable data transmissions.

In another embodiment, the CTS2SELF and CF-END packets may be transmitted using different channel configurations. In the standard 802.11b/g, a channel used is configured to be 22 MHz wide (or the channels may be referred to as 20 MHz channels) with 5 MHz spaced apart from another channel, and this makes a total number of 14 available channels. In the standard 802.11n, a channel used is configured to be 40 MHz wide with a 20 MHz wide primary channel and an adjacent secondary channel spaced ±20 MHz away. Specifically, the CTS2SELF packet may be transmitted using a channel configuration which is in compliance with the standard 802.11b or 802.11g, and the CF-END packet may be transmitted using another channel configuration which is in compliance with the standard 802.11n. This way, all WiFi stations may receive and decode the CTS2SELF packet since the channel configuration is specified in all versions of the 802.11 standard, while only the WiFi stations supporting the standard 802.11n may receive and decode the CF-END packet and accordingly respond to it. It is to be understood that other feature differences between different standard versions may be employed to carry out the spirit of the invention, based on the embodiments described in FIGS. 5 to 8.

It is noted that, regarding the transmission of the CTS2SELF packet and the CF-END packet in FIGS. 5 to 8, the wireless communications system 400 may further use the Point Coordination Function (PCF) technique rather than using the Distributed Coordination Function (DCF) technique, to configure the inter-frame spacing (IFS). When an AP wishes to perform data transmission upon detecting that the channel is available, it has to wait for a specified IFS duration before accessing the channel. That is, the wireless communications system 400 has to wait for a PCF-IFS (PIFS) duration rather than a DCF-IFS (DIFS) duration to access the channel. Due to the fact that the PIFS duration is less than the DIFS duration, the wireless communications system 400 may always have a higher priority than the WiFi stations to access the channel. Thus, the CTS2SELF packet and the CF-END packet may be delivered as soon as possible to accomplish the categorized channel reservation of this invention.

Figure 9:
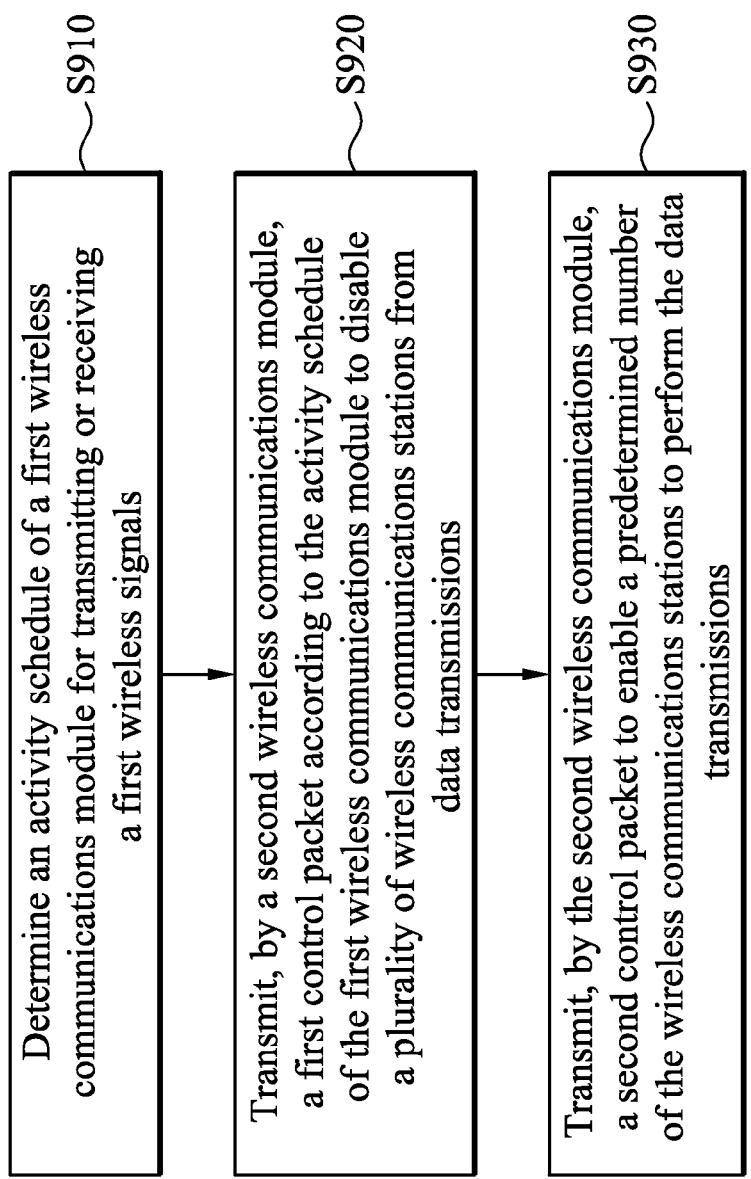
FIG. 9 is a flow chart of the method for categorized channel reservation according to an embodiment of the invention.

FIG. 9 is a flow chart of the method for categorized channel reservation according to an embodiment of the invention. The method may be applied to any wireless communications system comprising a plurality of wireless communications modules. Specially, the method aims to improve the performance of a contention-based wireless communication module among the plurality of wireless communications modules in a wireless communications system. Taking the wireless communications system 400 for example, two wireless communications modules, i.e. the WiFi module 410 and the BT module 420, are co-located and both share a single antenna 430. To begin, the wireless communications system 400 first determines the activity schedule of the BT module 420 for transmitting or receiving BT signals (step S910). In one embodiment, the activity schedule of the BT module 420 may be generated by the BT module 420 and then forwarded to the WiFi module 410. In another embodiment, the wireless communications system 400 may further comprise a coexistence manager (not shown) for coordinating the potential operations of the WiFi module 410 and the BT module 420, and the activity schedule of the BT module 420 may be requested from the coexistence manager. Subsequently, the WiFi module 410 transmits a first control packet according to the activity schedule of the BT module 420 to disable all WiFi stations in the established WLAN from data transmissions (step S920). Later, the WiFi module 410 transmits a second control packet to enable a predetermined number of the WiFi stations to perform the data transmissions (step S930). The first control packet may specify a duration in which the data transmissions from all WiFi stations in the WLAN are not allowed, and the duration may be determined based on the potential operations of the BT module 420 indicated in the activity schedule of the BT module 420. On the other hand, the second control packet is used to indicate to the receiving WiFi stations that the prohibition of the data transmissions has been cancelled. However, it is noted that the first control packet and the second control packet are transmitted in a special condition, such that all WiFi stations may receive the first control packet while only the predetermined number of the WiFi stations may receive the second control packet. The special condition may be that the first control packet is transmitted using a transmission power high enough to ensure the deliveries of the first control packet to all WiFi stations, and the second control packet is transmitted using a relatively lower transmission power which only ensure the deliveries of the second control packet to the WiFi stations located in a short distance from the wireless communications system 400, as described in relation to FIG. 5 and FIG. 6. Alternatively, the special condition may be that the first control packet is transmitted to all WiFi stations using the non-HT modulation scheme, and the second control packet is transmitted to all WiFi stations using the HT modulation scheme, where only the WiFi stations supporting the HT modulation scheme may be able to decode the second control packet, as described in relation to FIG. 7 and FIG. 8. In addition, the special condition may be that the first control packet and the second control packet are transmitted using different channel configurations.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). For example, the wireless communications system 400 may comprise more wireless communications modules of wireless communication technologies other than WiFi and BT technologies, such as the WiMAX technology, the LTE technology, the WCDMA technology, and others. Therefore, the scope of the appended claims should be accorded the broadest interpretation so as to encompass all such modifications and similar arrangements.

What is claimed is:

1. A wireless communications system, comprising:
    an antenna; and
    a wireless communications module configured to operate and communicate with a plurality of wireless communications stations via the antenna in compliance with a wireless communications protocol, wherein said communications comprise transmitting a first control packet to disable at least one of the wireless communications stations from data transmissions in compliance with the wireless communications protocol, and transmit a second control packet to enable at least one of the disabled wireless communications stations to perform the data transmissions,
    wherein the first control packet is transmitted using a first transmission power or modulation scheme, and the second control packet is transmitted using a second transmission power or modulation scheme.

2. A method for a wireless communications system to control wireless communications with a plurality of wireless communications stations, comprising:

transmitting, by a wireless communications module which operates and communicates with the wireless communications stations in compliance with a wireless communications protocol, a first control packet to disable at least one of the wireless communications stations from data transmissions in compliance with the wireless communications protocol; and transmitting, by the wireless communications module, a second control packet to enable at least one of the disabled wireless communications stations to perform the data transmissions;

wherein the first control packet is transmitted using a first transmission power or modulation scheme, and the second control packet is transmitted using a second transmission power or modulation scheme.

\* \* \* \* \*